United States Patent
Xhafa et al.

(10) Patent No.: US 10,536,891 B1
(45) Date of Patent: Jan. 14, 2020

(54) USING ESTIMATED TIME DRIFT TO DETERMINE KEEP ALIVE PERIODICITY IN SYNCHRONIZED NETWORKS

(71) Applicant: Texas Instruments Incorporated, Dallas, TX (US)

(72) Inventors: Ariton E. Xhafa, Plano, TX (US); Jianwei Zhou, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/024,336

(22) Filed: Jun. 29, 2018

(51) Int. Cl.
- *H04J 3/06* (2006.01)
- *H04L 12/26* (2006.01)
- *H04W 40/00* (2009.01)
- *H04W 40/24* (2009.01)
- *H04W 56/00* (2009.01)
- *H04W 24/08* (2009.01)

(52) U.S. Cl.
CPC ......... *H04W 40/005* (2013.01); *H04W 24/08* (2013.01); *H04W 40/244* (2013.01); *H04W 56/001* (2013.01)

(58) Field of Classification Search
CPC . H04W 40/005; H04W 40/244; H04W 24/08; H04W 56/001
USPC .... 370/252, 254–256, 503–519; 375/240.28, 375/354–370
See application file for complete search history.

(56) References Cited

U.S. PATENT DOCUMENTS

| | | | |
|---|---|---|---|
| 8,699,406 B1* | 4/2014 | Charles | H04L 7/048 370/324 |
| 2006/0187866 A1* | 8/2006 | Werb | G01D 4/004 370/311 |
| 2013/0301501 A1* | 11/2013 | Olvera-Hernandez | H04W 52/0216 370/311 |
| 2015/0036573 A1* | 2/2015 | Malik | H04W 52/0254 370/311 |
| 2016/0037449 A1* | 2/2016 | Kandhalu Raghu | H04W 52/0209 370/311 |
| 2019/0188997 A1* | 6/2019 | Gilson | G08B 29/18 |

OTHER PUBLICATIONS

"IEEE Standard for Low-Rate Wireless Personal Area Networks (WPANs)", IEEE Std 802.15.4-2015 (Revision of IEEE Std 802.15.4-2011), Approved Dec. 5, 2015, IEEE Computer Society, pp. 1-709.

(Continued)

*Primary Examiner* — Thai D Hoang
(74) *Attorney, Agent, or Firm* — Brian D. Graham; Charles A. Brill; Frank D. Cimino

(57) ABSTRACT

A method for operating a node in a wireless network is provided that includes computing an estimated time drift between the node and a parent node of the node, and using the estimated time drift and a number of hops between the node and a root node of the wireless network to determine a keep alive period for the node.

22 Claims, 5 Drawing Sheets

(56) References Cited

OTHER PUBLICATIONS

David Stanislowski et al, "Adaptive Synchronization in IEEE802.15.4e Networks", IEEE Transactions of Industrial Informatics, vol. 10, Issue 1, Feb. 2014, first published Mar. 27, 2013, pp. 795-802.
"CC2650 SimpleLink Multistandard Wireless MCU", Texas Instruments Inc., SWRS158B, Feb. 2015, Revised Jul. 2016, pp. 1-64.
Simon Duquennoy et al, "TSCH and 6TiSCH for Contiki: Challenges, Design and Evaluation", 13th International Conference on Distributed Computing in Sensor Systems (DCOSS), Jun. 5-7, 2017, Ottawa, Ontario, Canada, pp. 1-8.

* cited by examiner

USING ESTIMATED TIME DRIFT TO DETERMINE KEEP ALIVE PERIODICITY IN SYNCHRONIZED NETWORKS

BACKGROUND

For increased reliability and decreased power consumption, low-power wireless networks increasingly using time synchronized medium access control (MAC) protocols. The nodes in such networks use time slots for communication and thus need to maintain clock synchronicity. Factors such as manufacturing differences, temperature, and supply voltage can cause the clocks in network nodes to drift with respect to one another. Therefore, the nodes may need to resynchronize periodically.

SUMMARY

Examples of the present disclosure relate to methods and apparatus for using estimated time drift to determine keep alive periodicity in synchronized networks. In one aspect, a method for operating a node in a wireless network is provided that includes computing an estimated time drift between the node and a parent node of the node, and using the estimated time drift and a number of hops between the node and a root node of the wireless network to determine a keep alive period for the node.

In one aspect, a wireless communication device in a wireless network is provided that includes a memory storing software instructions and a processor coupled to the memory to execute the software instructions, wherein execution of the software instructions causes the wireless communication device to compute an estimated time drift between the wireless communication device and a first parent wireless communication device of the wireless communication device, and use the estimated time drift and a number of hops between the wireless communication device and a root wireless communication device of the wireless network to determine a keep alive period for the wireless communication device.

DETAILED DESCRIPTION

Figure 1:
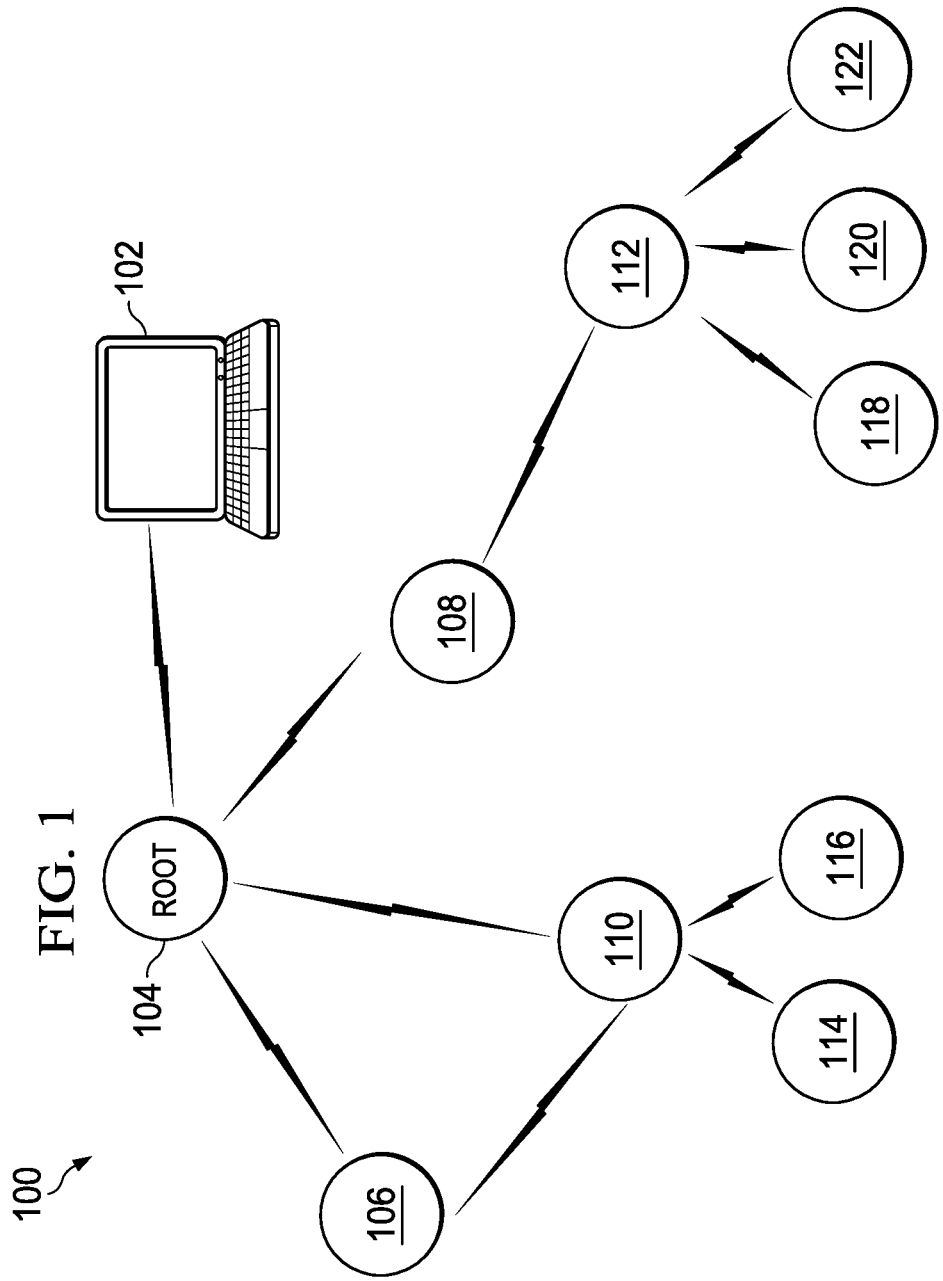
FIG. 1 depicts an example multi-hop wireless network.

Specific examples of the disclosure will now be described in detail with reference to the accompanying figures. Like elements in the various figures are denoted by like reference numerals for consistency.

Examples are explained herein in reference to "IEEE Standard for Low-Rate Wireless Personal Area Networks (WPANs)," The Institute of Electrical and Electronics Engineers, Inc., New York, N.Y., Apr. 22, 2016, which is incorporated by reference and referred to as "IEEE 802.15.4-2015" herein. Further, examples are based on timeslotted channel hopping (TSCH) as described in IEEE 802.15.4-2015. However, the concepts described herein are applicable to other time synchronized protocols such as, for example, WirelessHART, a wireless networking technology standard developed by the HART Communication Foundation, ISA 100.11a, a wireless networking technology standard developed by the International Society of Automation, and IEEE 802.15.4e-2012.

FIG. 1 depicts an example multi-hop wireless network 100. The example network 100 includes a root node 104, four intermediate nodes 106, 108, 110, 112 and five leaf nodes 114, 116, 118, 120, 122. A node may be, for example, a control device such as a light bulb or a door lock or a sensing device such as a smoke alarm or door sensor in an alarm system or may be both a control device and a sensing device such as a thermostat or a base station in an alarm system. An external device 122 such as a laptop, smart phone, or tablet communicates with nodes in the network 100 via the root node 104.

Each of the nodes 104-122 includes a TSCH medium access (MAC) layer as defined in IEEE 802.15.4-2015. In a TSCH network, time is divided into slots for communication, and all intermediate and leaf nodes are time-synchronized to the root node. The time slots are grouped in slot frames and a TSCH schedule managed by another network layer instructs each node as to what the node should do in a given time slot: transmit, receive, or sleep. The schedule is a logical two-dimensional matrix with one dimension determining the slot offset in the slot frame and the other dimension designating the channel offset in the available frequency band. The width of the schedule is equal to the slot frame width and the depth is equal to the number of available frequencies (or channels) in the allotted band.

Further, a TSCH network uses channel hopping in which a particular MAC layer channel offset at the same time slot over successive slot frames in the schedule translates into a different frequency (or physical channel) at each iteration of the slot frame. The result is that successive packets exchanged between neighbor nodes are communicated at different frequencies. Because all nodes share common time and channel information, nodes can hop over the entire channel space to minimize the negative effects of multipath fading and interference and can do so in a slotted way to avoid collisions, minimizing the need for retransmissions.

In a TSCH network, a coordinator such as the root node 104 and/or an intermediate node 106, 108, 110, 112 transmits periodic beacons that contain information that facilitates nodes joining and communicating in the network. Information contained in the beacon packets can be, for example, the channels to be used at a specific time, timing information regarding when a beacon was transmitted, link information, etc.

The nodes in a TSCH network each have an internal clock, typically a crystal oscillator. The frequency of a crystal can be affected by, for example, manufacturing differences, temperature, and/or supply voltage. Thus, there can be some time drift between node pairs and the drift can differ between node pairs as each crystal may drift differently. For example, over time there may be some drift between the root node 104 and the intermediate node 108, between the intermediate node 108 and the intermediate node 112, and between the intermediate node 112 and each of the leaf nodes 118, 120, 122.

Data traffic between nodes in a TSCH network is used to implicitly resynchronize a node with its parent node. However, in the absence of data traffic, a node may communicate a keep alive frame with its parent node at least once per a keep alive period to maintain synchronicity with the root node and/or the parent node. The use of keep alive frames by a node for synchronization operates as follows. The node sets a wakeup timer for the keep alive period. When the timer expires, the node sends a keep alive frame, e.g., a null frame, to its parent node asking for a time correction. The parent node replies with an acknowledgement frame that contains the timing correction, e.g., the difference in time between the expected frame arrival time and the actual arrival time. The node uses this difference to re-synchronize the internal clock with the parent node as needed.

The duration of the keep alive period is not defined in IEEE 802.15.4-2015. A keep alive period can be defined, for example, as a guard time divided by the clock accuracy, where the guard time is a period of time added between time slots to allow for some de-synchronization. For example, assume the guard time for the network 100 is 1 ms and the crystal clock accuracy of the leaf node 120 is 40 parts per million (ppm). Thus, the leaf node 120 sends a keep alive frame to the intermediate node 112 every 25 seconds if there is no other network activity within the 25 second period.

Relying on periodicity of keep alive frames to maintain synchronicity with the root node can be sufficient if the TSCH network is a single hop network, e.g., all nodes in the network are directly connected to the root node. However, in a multi-hop network such as the network 100, the drift between node pairs in a multi-hop path accumulates over hops. To maintain synchronicity, the periodicity of keep alive frames needs to be such that the accumulated drift incurred at any particular node is less than the guard time. For example, assume the guard time is 1 ms and the drift between the root node 104 and the intermediate node 110 is 1 ms and the drift between the intermediate node 110 and the leaf node 114 is also 1 ms. The intermediate node 110 learns that the drift from the root node 104 is 1 ms and resynchronizes with the root node 104. The drift between the leaf node 114 and the root node 104 and the drift between the intermediate node 110 and the leaf node 114 are both now 2 ms. The 2 ms drift is larger than the guard time and thus the leaf node 114 is desynchronized and must reconnect with the network 100.

Examples of the disclosure provide for determining the keep alive period for nodes in a multi-hop network such as the network 100. In some examples, drift between a node pair is estimated when a node joins the network 100 and the estimated drift and the number of hops from the root node are used to determine the keep alive period for the joining node. In some such examples, the estimated drift is also used after the node joins the network to determine a keep alive time compensation factor when synchronization fails, e.g., due to network interference. The keep alive time compensation factor is used in conjunction with the keep alive period to set the wakeup timer for the node.

Figure 2:
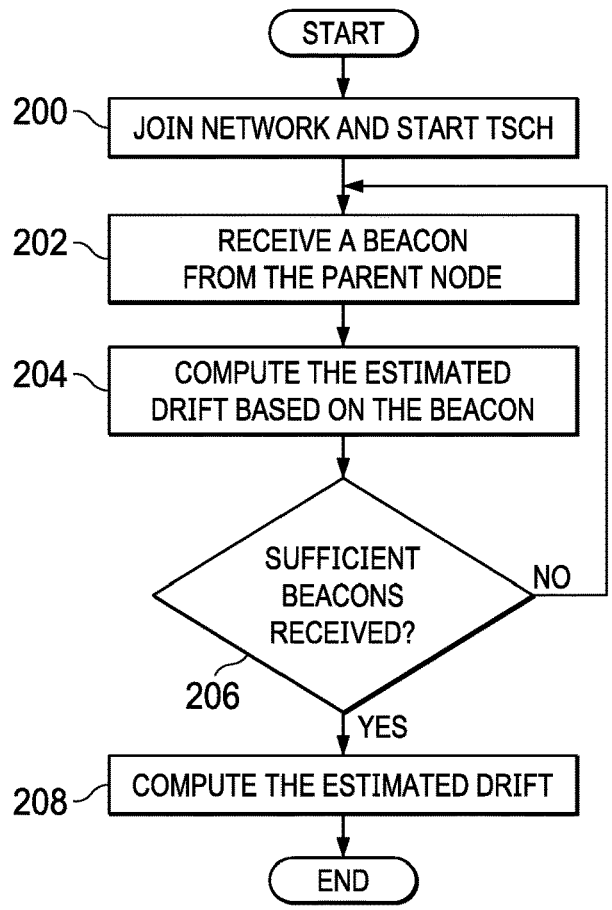
FIG. 2 is a flow diagram of a method for estimating drift between a pair of nodes in the network of FIG. 1.

FIG. 2 is a flow diagram of a method for estimating drift between a pair of nodes in the network 100. The method is performed when a node is connecting to the network 100 for the first time, e.g., when the nodes in the network 100 are powered up. Initially, the node joins 200 the network 100 and starts TSCH. The node then receives 202-206 multiple beacons from the parent node, computing 204 an estimate of the time drift from the parent node for each beacon. The node computes 204 the beacon-based time drift estimate based on an estimated time the beacon was expected to arrive. For example, using information in the previously received beacon that indicates when the network 100 started, the beacon interval, etc., the node estimates when the next beacon will arrive. When the next beacon arrives, the difference between the estimated time of arrival of the beacon and the actual time of arrival of the beacon is the beacon-based time drift estimate. The number of beacons received for this purpose can be empirically determined. In some examples, the number of beacons is ten.

The node then computes 208 an estimated time drift based on the multiple beacon-based time drift estimates. In some examples, the estimated time drift $d_u$ is computed as an average of the multiple beacon-based time drift estimates as per $$d_u = \frac{\sum_{i=1}^{n} \frac{d_i}{t_i}}{n}$$

where n is the number of beacon-based time drift estimates, $d_i$ is a beacon-based time drift estimate, and $t_i$ is the corresponding time interval between beacons. In some examples, if there is a large variation in the beacon-based time drift estimates, the maximum beacon-based time drift estimate is used rather than the average. The amount of variation in the beacon-based time drift estimates that triggers use of the maximum beacon-based time drift estimate is determined, for example, by the system designer or as an empirically determined variation percentage.

Figure 3:
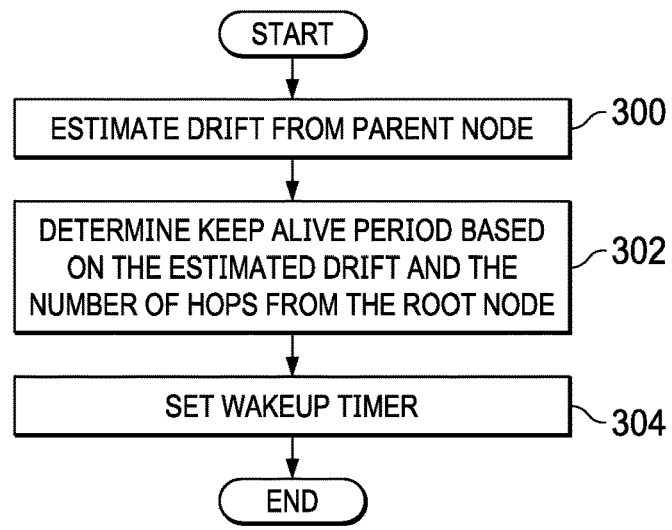
FIG. 3 is a flow diagram of a method for determining a keep alive period in the network of FIG. 1.

FIG. 3 is a flow diagram of a method for determining a keep alive period for a node in the network 100. Initially, a node joining the network 100 estimates 300 the drift from its parent node. Any suitable technique for estimating the drift can be used. In some examples, the node estimates the drift using the method of FIG. 2.

The node then determines 302 a keep alive period based on the estimated drift and the number of hops from the root node 104 to the node. The maximum time interval $T_s$ for which a node can stay synchronized without sending a keep alive frame is estimated as per $$T_s = T_g/d_u$$

where $T_g$ is the guard time and $d_u$ is the estimated time drift. The maximum keep alive period $T_{KA}$ for the node is then computed as per $$T_{KA} = T_s/n$$

where n is the number of hops from the root node 104 to the joining node. For example, if the joining node is the node 106, n=1 and $T_{KA}=T_s$. In another example, if the joining node is the node 122, n=3 and $T_{KA}=T_s/3$. The joining node can select the time interval for its keep alive period to be any reasonable value less than or equal to the maximum time interval $T_{KA}$.

The joining node then sets 304 a wakeup timer based on the determined keep alive period and begins operating in the network 100. While the frequency of sending keep alive frames/packets helps in maintaining synchronization, issues can arise when transmission of a keep alive frame or other frames is not successful due to, e.g., network interference or higher priority transmissions. To further ensure that synchronicity is maintained, a node applies a keep alive time compensation factor to the current keep alive period as needed.

Figure 4:
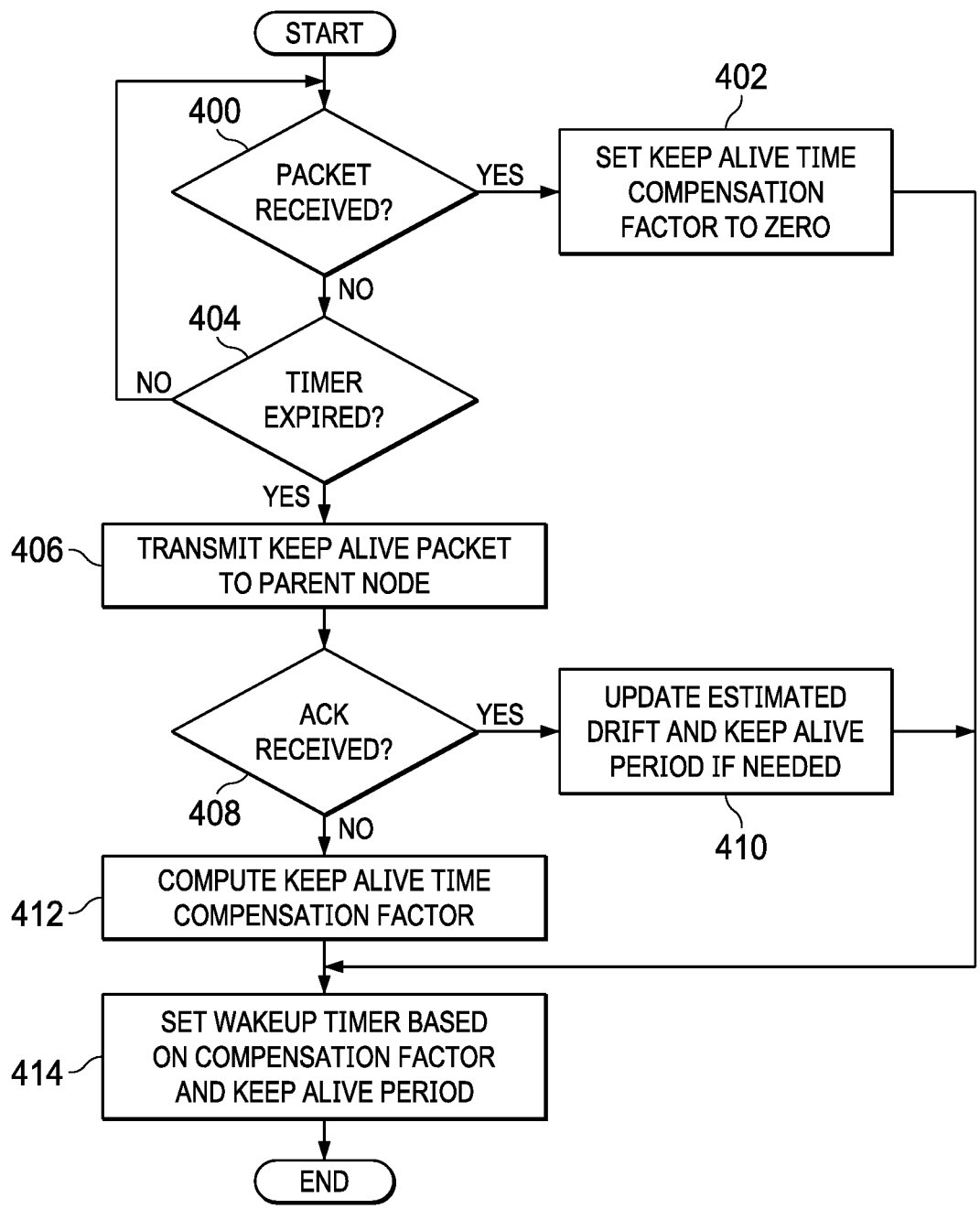
FIG. 4 is a flow diagram of a method for determining and using a keep alive compensation factor in the network of FIG. 1.

FIG. 4 is a method for determining and using a keep alive time compensation factor in a node of the network 100.

When the node joins the network 100, the keep alive time compensation factor is assumed to be zero as synchronization is established when the node joins the network 100. To maintain synchronicity, the node waits in each time slot to either receive 400 a packet or for the wakeup timer to expire 404. If a packet is received 400 before the wakeup timer expires, the node processes the packet (not shown) and sets 402 the keep alive time compensation factor to zero as reception of the packet indicates the node is synchronized with the parent node. The node then sets 414 the wakeup timer based on the keep alive time compensation factor and the keep alive period and resumes waiting for either packet reception or expiration of the wakeup timer. In this instance, the keep alive time compensation factor is zero, so the wakeup timer is set to the current keep alive period.

If the wakeup timer expires 404, the node transmits 406 a keep alive packet to the parent node and waits for an acknowledgement (ACK) packet. If the ACK is not received 408 due to, e.g., network interference or no transmission of the keep alive packet due to higher priority transmissions, the node computes 412 a new keep alive time compensation factor $t_{comp}$ as per $$t_{comp} = t_{lastsynch} * d_u$$

where $d_u$ is the current estimated drift for the node and $t_{lastsynch}$ is the time elapsed since the last time the node successfully synchronized with the parent node. The node then sets 414 the wakeup timer based on the keep alive time compensation factor $t_{comp}$ and the current keep alive period $T_{KA}$. That is, the node sets the wakeup timer to be $T_{KA} - t_{comp}$. The node then resumes waiting for either packet reception or expiration of the wakeup timer.

If the ACK is received 408, the node updates 410 the estimated drift $d_u$ and the keep alive period $T_{KA}$ if needed. More specifically, the ACK packet includes a time correction information element that informs the node of the current time drift between the parent node and the node. The node uses this information and the time elapsed since the last successful synchronization with the parent node to determine if the time drift $d_u$ has changed. If the time drift $d_u$ has changed, the node sets the time drift $d_u$ for the node to the new time drift and recomputes the keep alive period $T_{KA}$ and the keep alive time compensation factor $t_{comp}$ as previously described herein. Otherwise, the time drift $d_u$ for the node, the keep alive period $T_{KA}$, and the keep alive time compensation factor $t_{comp}$ are not changed. The node 414 then sets the wakeup timer based on the current keep alive time compensation factor $t_{comp}$ and the current keep alive period. For example, the node sets the wakeup timer to be $T_{KA} - t_{comp}$. The node then resumes waiting for either packet reception or expiration of the wakeup timer.

In some examples, to further insure that a child node does not lose synchronization with its parent node, the parent node keeps the child node informed as to the last time the parent node synchronized with its parent. The child node can then use this information to ensure that the child node synchronizes with its parent node before the parent node again synchronizes with its parent node. More specifically, when a child node is synchronized with its parent node, the parent node begins including a parent synchronization information element (IE) in the beacons and data frames that conveys when the parent node last synchronized with its parent node.

Figure 5:
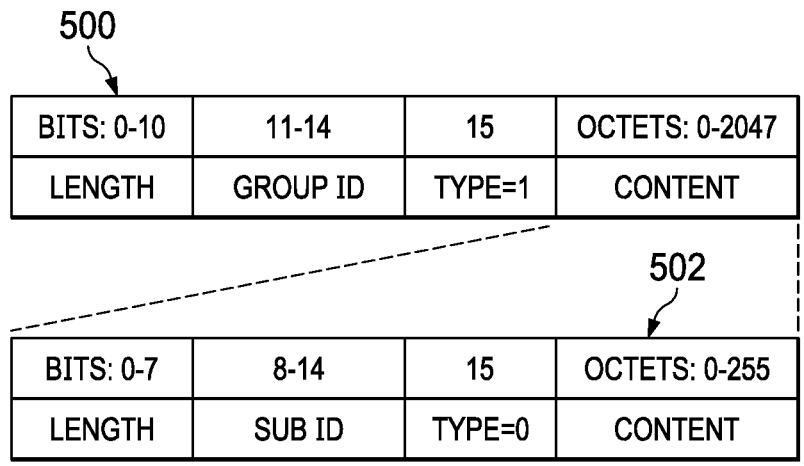
FIG. 5 is an example of a parent synchronization information element.

FIG. 5 is an example of a parent synchronization IE. The parent synchronization IE 502 is implemented as a nested IE as defined in IEEE 802.15.4-2015, e.g., the parent synchronization IE 502 is nested in the content field of a payload IE 500. The content field of the parent synchronization IE 502 is an octet in which the eight bits are set as follows. If the parent node has completed synchronization with its parent node, the most significant bit of the content field of is set to one. The remaining seven bits indicate the approximate number of beacon periods since the synchronization was last performed, where the number of beacon periods nrBcnPeriods is given by:

$$\text{nrBcnPeriods} = \min\{(\text{GuardTime}/(d_u * \text{BcnInterval}), (2^7 - 1)\}$$

where BcnInterval is the time interval between beacon transmissions and $(2^7-1)$ is the largest number that can be represented in the number of bits allocated for nrBcnPeriods. If the time elapsed since the last synchronization is greater than $(2^7-1)*\text{BcnInterval}$, the most significant bit is set to 0.

The child node uses the information in the parent synchronization IE to decide when to synchronize with the parent node, e.g., when to send a keep alive packet. For example, if the parent node has not synchronized with its parent node for five beacon periods and needs another ten beacon periods to perform the synchronization, the child node can decide to synchronize with its parent before the ten beacon interval elapses.

Figure 6:
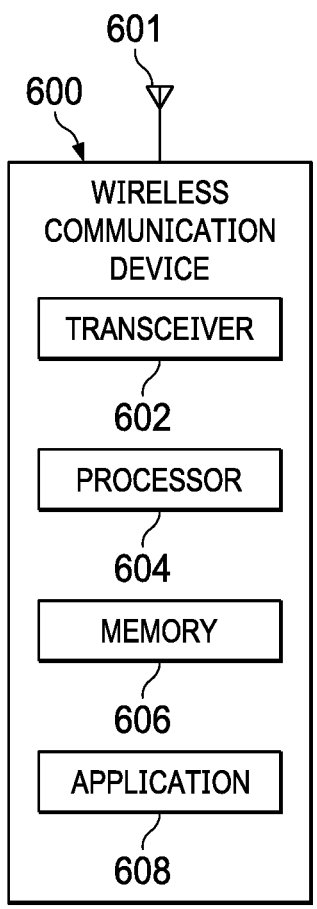
FIG. 6 is a simplified block diagram of an example wireless communication device.

FIG. 6 is a simplified block diagram of an example wireless communication device 600 suitable for use as a node in the network 100. The wireless communication device 600 includes an antenna 601, a transceiver component 602, a processor component 604, a memory component 606, and an application component 608. The antenna 601 is configured to receive and transmit radio frequency (RF) signals. The transceiver component 602 is configured to modulate received RF signals and to modulate RF signals to be transmitted. The memory component 606 may include any suitable memory such as random access memory (RAM), read-only memory (ROM), flash memory, or the like, or a combination of such memory. The application component 608 is configured to perform the function of the wireless communication device 600, e.g., controlling an alarm, controlling a light, temperature sensing, etc.

The processor component 604 may include one or more suitable processors such as programmable general-purpose or special-purpose microprocessors, digital signal processors (DSPs), application specific integrated circuits (ASICs), programmable controllers, programmable logic devices (PLDs), or the like, or a combination of such devices. The processor component 604 is further configured to execute software instructions stored in the memory component 606 that cause the wireless communication device 600 to perform methods as described herein.

Figure 7:
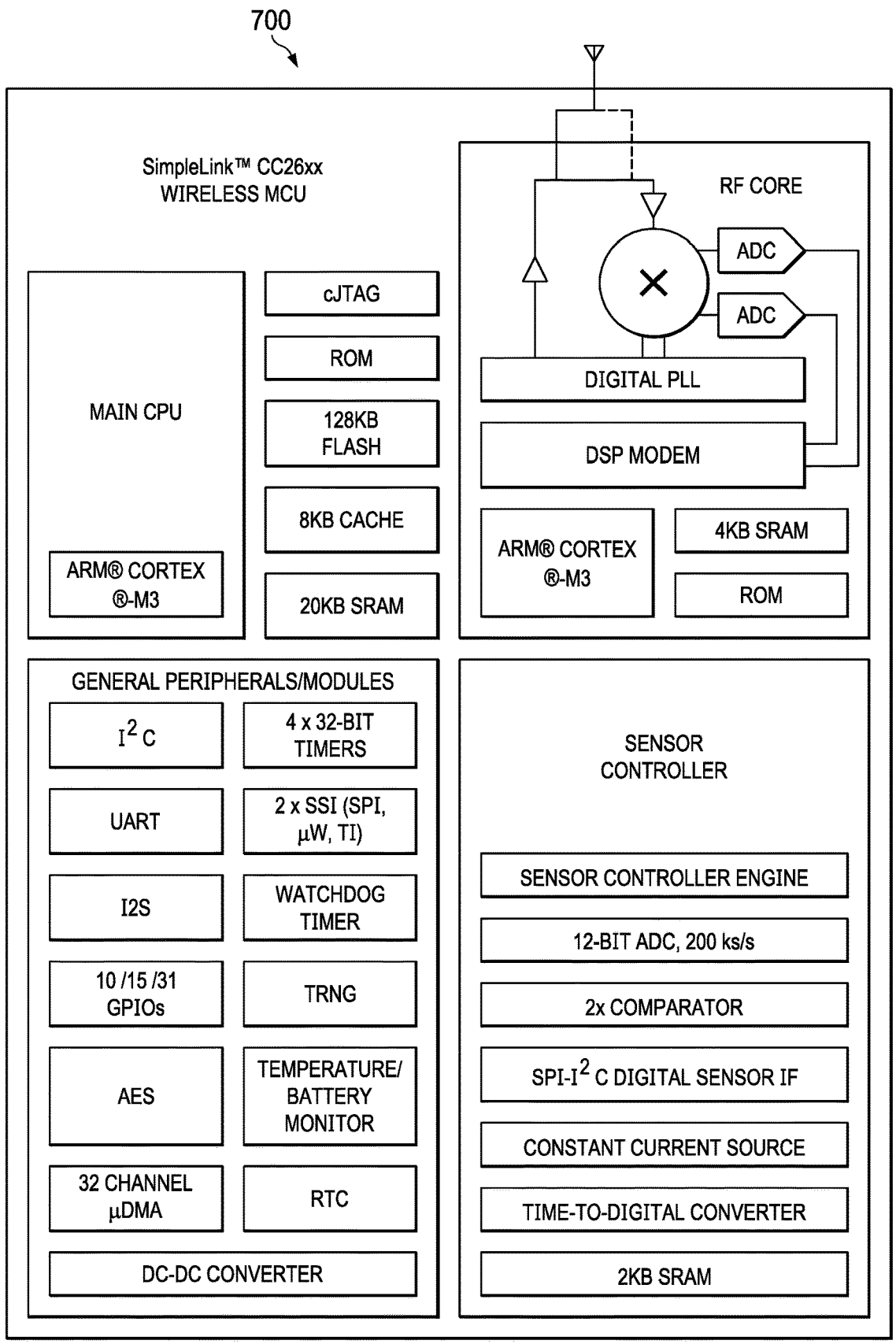
FIG. 7 is a simplified block diagram of an example wireless communication device.

FIG. 7 is a simplified block diagram of an example wireless sensor device 700, e.g., a wireless communication device, that may be deployed as a node in a wireless network such as the example network 100 of FIG. 1 and may be configured to perform methods as described herein. More specifically, the example wireless sensor device 700 may be embodied as a CC26xx SimpleLink™ Multistandard wireless microcontroller (MCU) integrated circuit (IC) available from Texas Instruments. The CC26xx family of ultralow-power microcontrollers includes multiple devices featuring an ultralow power CPU and different peripherals targeted for various applications. The particular MCU depicted is the CC2650. A brief description of the CC2650 is provided herein. A detailed description of the CC2650 is provided in Texas Instruments publication SWRS158B, "CC2650 SimpleLink™ Multistandard Wireless MCU," February 2015, which is incorporated by reference herein.

The MCU 700 incorporates a 32-bit ARM® Cortex®-M3 as the main processor and a peripheral feature set that includes an ultra-low power sensor controller for interfacing external sensors and/or collecting analog and digital data autonomously while the rest of the system is in sleep mode. The MCU 700 also incorporates an RF core based on an ARM® Cortex®-M0 processor. The RF core is designed to autonomously handle time critical aspects of various radio protocols. The RF core includes a dedicated 40 KB static random access memory (SRAM) and a dedicated read-only memory (ROM).

The MCU 700 also incorporates 128 KB of flash memory that provides nonvolatile storage for code and data, 20 KB of SRAM that can be used for both storage of data and execution of code, and a ROM storing a real-time operating system kernel. General peripherals/modules on the MCU 700 may include a 12-bit ND converter, a 16-channel comparator with voltage reference generation and hysteresis capabilities, interfaces for SPI, Microwire, and UART protocols, internal direct memory access (DMA), a real-time clock, multiple 16/32-bit timers, and more.

Software instructions implementing methods as described herein can be stored in a computer readable medium on the MCU 700 such as the flash memory, the static random access memory (SRAM), or the read-only memory (ROM) on the MCU 700 and executed by the main processor.

OTHER EXAMPLES

While the disclosure has been described with respect to a limited number of examples, those having benefit of this disclosure will appreciate that other examples can be devised which do not depart from the scope of the disclosure as disclosed herein.

Examples have been described herein in which time drift is estimated when a node joins a network. In other examples, recalculation of the time drift is triggered under circumstances such as detection of temperature variations and changes in the environment.

Examples have been described herein in which a joining node has a single time source neighbor. In other examples, a joining node can have more than one time source neighbor. In such examples, the joining node computes estimated drift for each time source neighbor and the final estimated drift as either an average of the estimated drifts or as the maximum of the estimated drifts.

It is therefore contemplated that the appended claims will cover any such modifications of the examples as fall within the true scope of the disclosure.

What is claimed is:

1. A method for operating a node in a wireless network, the method comprising:
   computing an estimated time drift between the node and a parent node of the node;
   using the estimated time drift and a number of hops between the node and a root node of the wireless network to determine a keep alive period for the node;
   setting a wakeup timer of the node based on the keep alive period for the node; and
   in response to expiration of the wakeup timer, transmitting a keep alive packet from the node to the parent node.

2. The method of claim 1, wherein using the estimated time drift further comprises:
   computing a maximum time interval in which the node can stay synchronized with the parent node as a guard time divided by the estimated time drift;
   computing a maximum keep alive period for the node as the maximum time interval divided by the number of hops; and
   determining the keep alive period based on the maximum keep alive period.

3. The method of claim 1, wherein computing an estimated time drift further comprises:
   receiving a plurality of beacons from the parent node in the node;
   computing a plurality of beacon-based time drift estimates for the node, wherein a beacon-based time drift estimate is computed when a beacon of the plurality of beacons is received; and
   computing the estimated time drift for the node based on the plurality of beacon-based time drift estimates.

4. The method of claim 3, wherein computing the estimated time drift further comprises computing the estimated time drift as per $$d_u = \frac{\sum_{i=1}^{n} \frac{d_i}{t_i}}{n}$$

wherein $d_u$ is the estimated time drift, n is a number of beacon-based time drift estimates in the plurality of beacon-based time drift estimates, $d_i$ is a beacon-based time drift estimate of the plurality of beacon-based time drift estimates, and $t_i$ is a time interval between beacons corresponding to $d_i$.

5. The method of claim 3, wherein computing the estimated time drift further comprises selecting a maximum beacon-based time drift estimate of the plurality of beacon-based time drift estimates as the estimated time drift.

6. The method of claim 1, further comprising:
   setting the wakeup timer further based on a keep alive time compensation factor for the node.

7. The method of claim 6, further comprising:
   computing the keep alive time compensation factor for the node when the keep alive packet is not acknowledged, wherein the keep alive time compensation factor is based on the estimated time drift and a time interval since a last time the node synchronized with the parent node.

8. The method of claim 6, further comprising setting the keep alive time compensation factor to zero when a packet is received by the node before the wakeup timer expires.

9. The method of claim 7, further comprising updating the estimated time drift and the keep alive period when the keep alive packet is acknowledged.

10. The method of claim 1, wherein the parent node is a first parent node, the method further comprising:
    receiving a parent synchronization information element in the node, the parent synchronization information element comprising information regarding a last time the first parent node synchronized with a parent node of the first parent node; and
    using the information to decide when to synchronize the node with the first parent node.

11. The method of claim 1, wherein the node and the parent node comprise a timeslotted channel hopping medium access layer.

12. A wireless communication device in a wireless network, the wireless communication device comprising:
a memory storing software instructions, wherein execution of the software instructions causes the wireless communication device to:
compute an estimated time drift between the wireless communication device and a first parent wireless communication device of the wireless communication device;
use the estimated time drift and a number of hops between the wireless communication device and a root wireless communication device of the wireless network to determine a keep alive period for the wireless communication device;
set a wakeup timer based on the keep alive period; and
in response to expiration of the wakeup timer, transmit a keep alive packet to the first parent wireless communication device; and
a processor coupled to the memory to execute the software instructions.

13. The wireless communication device of claim 12, wherein software instructions to use the estimated time drift further comprise software instructions to
compute a maximum time interval in which the wireless communication device can stay synchronized with the first parent wireless communication device as a guard time divided by the estimated time drift;
compute a maximum keep alive period for the wireless communication device node as the maximum time interval divided by the number of hops; and
determine the keep alive period based on the maximum keep alive period.

14. The wireless communication device of claim 12, wherein software instructions to compute the estimated time drift further comprise software instructions to
receive a plurality of beacons from the first parent wireless communication device in the wireless communication device;
compute a plurality of beacon-based time drift estimates for the wireless communication device, wherein each beacon-based time drift estimate is computed when a beacon of the plurality of beacons is received; and
compute the estimated time drift for the wireless communication device based on the plurality of beacon-based time drift estimates.

15. The wireless communication device of claim 14, wherein software instructions to compute the estimated time drift further comprise software instructions to compute the estimated time drift as per $$d_u = \frac{\sum_{i=1}^{n} \frac{d_i}{t_i}}{n}$$

wherein $d_u$ is the estimated time drift, n is a number of beacon-based time drift estimates in the plurality of beacon-based time drift estimates, $d_i$ is a beacon-based time drift estimate of the plurality of beacon-based time drift estimates, and $t_i$ is a time interval between beacons corresponding to $d_i$.

16. The wireless communication device of claim 14, wherein software instructions to compute the estimated time drift further comprise software instructions to select a maximum beacon-base time drift estimate of the plurality of beacon-based time drift estimates as the estimated time drift.

17. The wireless communication device of claim 12, further comprising software instructions to set the wakeup timer further based on a keep alive time compensation factor for the wireless communication device node.

18. The wireless communication device of claim 17, further comprising software instructions to
compute the keep alive time compensation factor for the wireless communication device when the keep alive packet is not acknowledged, wherein the keep alive time compensation factor is based on the estimated time drift and a time interval since a last time the wireless communication device synchronized with the first parent wireless communication device.

19. The wireless communication device of claim 17, further comprising software instructions to set the keep alive time compensation factor to zero when a packet is received by the wireless communication device before the wakeup timer expires.

20. The wireless communication device of claim 18, further comprising software instructions to update the estimated time drift and the keep alive period when the keep alive packet is acknowledged.

21. The wireless communication device of claim 12, further comprising software instructions to
receive a parent synchronization information element in the wireless communication device, the parent synchronization information element comprising information regarding a last time the first parent wireless communication device synchronized with a parent wireless communication device of the first parent wireless communication device; and
use the information to decide when to synchronize the wireless communication device with the first parent wireless communication device of the wireless communication device.

22. The wireless communication device of claim 12, wherein the wireless communication device and the first parent wireless communication device comprise a timeslotted channel hopping medium access layer.

* * * * *